(12) United States Patent
O'Neal et al.

(10) Patent No.: US 6,172,891 B1
(45) Date of Patent: Jan. 9, 2001

(54) AC VOLTAGE ADAPTER WITH INTEGRATED DC VOLTAGE POWER SUPPLY CONNECTOR

(75) Inventors: Sean P. O'Neal, Round Rock; Reynold Liao, Austin, both of TX (US)

(73) Assignee: Dell USA, L.P., Round Rock, TX (US)

( * ) Notice: Under 35 U.S.C. 154(b), the term of this patent shall be extended for 0 days.

(21) Appl. No.: 09/277,863

(22) Filed: Mar. 26, 1999

(51) Int. Cl.⁷ .............................. H02M 1/00; H02B 1/24
(52) U.S. Cl. ............................................. 363/146; 307/128
(58) Field of Search ................................... 363/142, 143, 363/146; 307/116, 125, 128, 130

(56) References Cited

U.S. PATENT DOCUMENTS

| | | |
|---|---|---|
| 3,654,539 | 4/1972 | Schnur et al. . |
| 3,809,999 | 5/1974 | Smith . |
| 3,982,173 | 9/1976 | Berry et al. . |
| 4,849,950 | 7/1989 | Sugiura et al. . |
| 5,159,545 | 10/1992 | Lee . |
| 5,245,220 * | 9/1993 | Lee ............................................. 307/80 |
| 5,483,437 * | 1/1996 | Tang ....................................... 363/146 |
| 5,629,604 | 5/1997 | Sengupta et al. . |
| 5,636,112 | 6/1997 | Faulk . |
| 5,654,740 | 8/1997 | Schulha . |
| 5,684,689 | 11/1997 | Hahn . |
| 5,698,964 | 12/1997 | Kates et al. . |
| 5,713,749 | 2/1998 | Wu . |
| 5,734,254 | 3/1998 | Stephens . |
| 5,818,705 | 10/1998 | Faulk . |
| 5,864,457 | 1/1999 | Kates et al. . |
| 5,940,282 * | 8/1999 | Oglesbee ................................ 363/21 |

* cited by examiner

*Primary Examiner*—Matthew Nguyen
(74) *Attorney, Agent, or Firm*—Haynes & Boone, L.L.P.

(57) ABSTRACT

A computer system operable on a DC voltage is provided. The computer system includes a microprocessor, a system memory coupled to the microprocessor, a bus coupled to the microprocessor, an input device coupled to the bus, and a voltage adapter system for providing a DC voltage to the computer system. The voltage adapter system includes a voltage modifying device adapted for converting an AC voltage to a DC voltage. A first cable assembly is electrically connected to supply the AC voltage from an AC power supply to the voltage modifying device. A second cable assembly is provided for selectively supplying the DC voltage to the system from the voltage modifying device or from a remote DC voltage power supply. The second cable assembly is connectable at a first end to the system and connectable at a second end to the voltage modifying device and to the remote DC voltage power supply.

20 Claims, 3 Drawing Sheets

AC VOLTAGE ADAPTER WITH INTEGRATED DC VOLTAGE POWER SUPPLY CONNECTOR

BACKGROUND

The disclosures herein relate generally to electrical voltage adapters and more particularly, AC to DC voltage adapters for electronic devices such as computer systems.

Many of today's airline, automobile and train passengers carry portable electronic devices such as notebook computers on-board for in-transit use. However, as computers consume large amounts of power, the batteries that operate the device do not last for more than typically 2–6 hours. On long trips or when the battery is weak, a computer can drain the battery quite rapidly. For the traveler attempting to minimize the weight of their computer luggage, heavy spare batteries are undesirable and still only provide a nominal amount of additional computer operating time.

Because the use of computers aboard airplanes is so common, some airlines have begun offering in-seat power systems for powering devices such as notebook computers. These power systems use an in-seat connector that is typically either a modified version of the standard auto cigarette lighter socket or a manufacturer specific plug configuration. In either case, some type of adapter is generally needed to connect with the computer to the in-seat connector.

The PRIMEX Aerospace Company (PAC) manufactures the EMPOWER in-seat power supply system. This system furnishes safe, DC power directly at the seat to permit uninterrupted laptop computer operation and battery charging throughout the flight. This eliminates concerns of batteries running out during in-flight usage. Furthermore, DC voltage is desirable as this is the type of voltage that notebook computers are designed to use as an input voltage.

The EMPOWER in-seat power system supplies approximately 15 VDC (volts DC). The typical automobile cigarette socket provides approximately 12 VDC. Because the level of power provided by different DC power sources varies from one power source to another, an adapter for providing the correct voltage for a specific computer is sometimes needed. For example, the EMPOWER in-seat power system requires the use of a special adaptor cord such as the POWEREXTENDER offered by Xtend Micro Products for enabling connection and voltage regulation to a device.

The POWEREXTENDER plugs into the in-seat power socket to provide an auxiliary source of power for operating the computer or for recharging the computer battery. The POWEREXTENDER takes the 15 volts from the airplane and converts it into the specific voltage required by the computer. Depending on the manufacturer and the model of the computer, a specific operating voltage may be required. Laptop computers manufactured by DELL Computer Corporation are designed to operate on any voltage within a range of from about 8 volts to about 19 volts. As a result, it is not necessary for the 15 volts provided by the EMPOWER in-seat power supply system to be converted to a different voltage.

Other solutions for converting and supplying DC power to electronic devices also exist. In the case of converting a supplied DC voltage to a voltage suitable for a computer, an adapter is available that converts a supplied DC voltage to 120 volts AC such that a standard AC adapter can then convert the AC voltage back to the DC voltage required by the computer. In the case of the EMPOWER in-seat power system, an adapter for allowing a device with a standard automobile cigarette lighter plug to be connected to the EMPOWER plug is available.

AC adapters are well known in the art. U.S. Pat. Nos. 5,698,964 and 5,864,457 disclose AC adapters for use with DC voltage operable devices such as notebook computers. The adapters disclosed in these references include a voltage converting portion for converting an AC voltage to a DC voltage and a voltage regulating portion for maintaining the DC voltage within a desired range. The inventive aspects of the illustrative embodiments presented herein may be applied to AC adapters known in the art such as those disclosed in these two references.

None of the current solutions teach a simple, compact and cost-effective apparatus for providing AC to DC converting as well as permitting interconnect capability to a remote DC voltage power supply such as an in-seat power supply system used on airplanes. Accordingly, a need has arisen for an apparatus that is configured to overcome the shortcomings of current techniques and constructions. In particular, a need has arisen for an apparatus for electronic devices such as notebook computer systems that can provide AC to DC power conversions as well as enable direct connection to a DC power source such as the EMPOWER in-seat power supply system.

SUMMARY

One embodiment, accordingly, provides a voltage adapter system for use with an electronic device such as a notebook computer that is capable of converting an AC voltage to a predetermined DC voltage. The system is capable of connecting the device directly to a suitable remote DC voltage power supply. To this end, one embodiment provides a voltage adapter system for use with a DC voltage operable device. The voltage adapter system includes a voltage modifying device adapted for converting an AC voltage to a DC voltage and a first cable assembly for being electrically coupled to supply the AC voltage from an AC power supply to the voltage modifying device. The system also includes a second cable assembly having a first portion adapted for being electrically coupled to the DC voltage operable device and a second portion adapted for being electrically coupled to selectively supply the DC voltage to the DC voltage operable device from the voltage modifying device or from a remote DC voltage power supply.

Many advantages are achieved by a voltage adapter system according to the illustrative embodiments presented herein. One adapter system provides for AC to DC converting as well as for connection with remote DC power sources. This voltage adapter system reduces the space and weight of the apparatus relative to conventional systems. One set of cable assemblies can be used for the AC to DC and DC to DC operation. The use of set of cable assemblies further reduces the weight and space requirements of the system. A system according to the illustrative embodiments presented herein can be designed to be compatible with existing electronic devices whereby no modification to the electronic devices is required.

BRIEF DESCRIPTION OF THE DRAWING FIGURES

DETAILED DESCRIPTION

Figure 1:
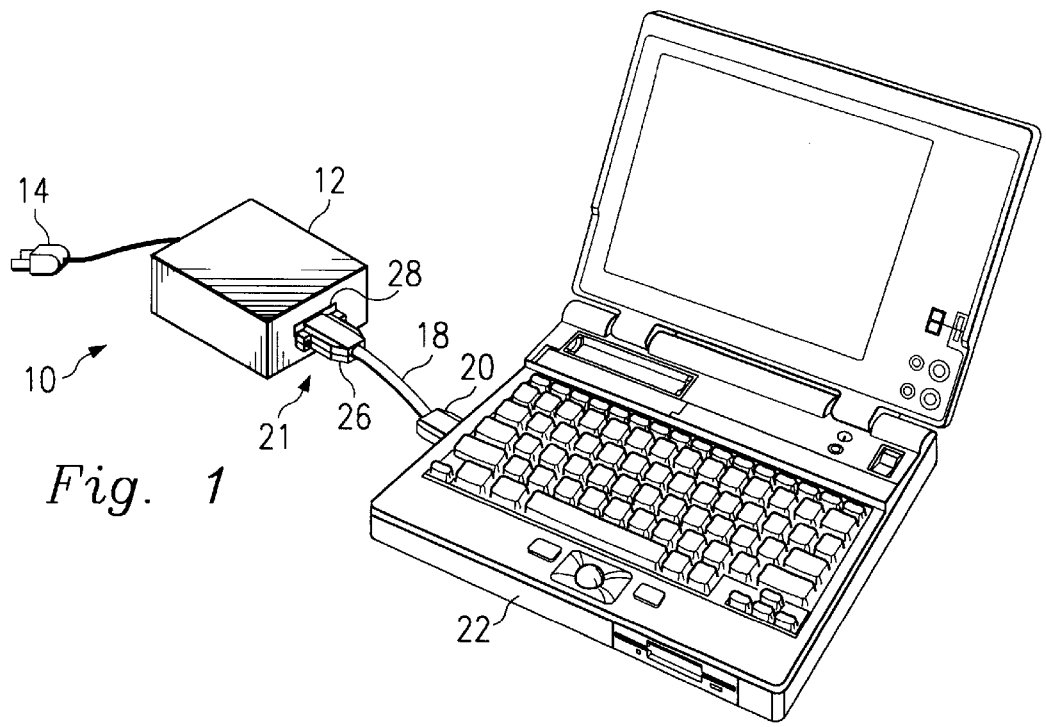
FIG. 1 is a diagrammatic view showing an illustrative embodiment of a voltage adapter system with a detachable DC power cable assembly.
Figure 2:
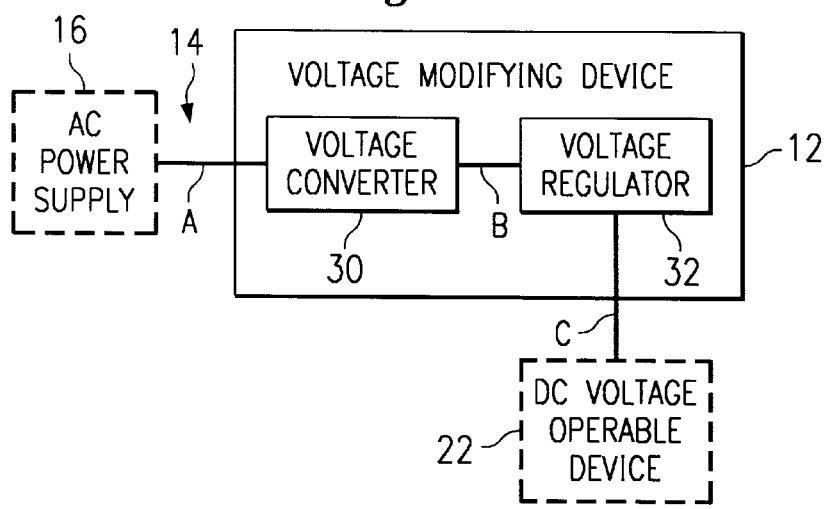
FIG. 2 is a block diagram showing a power routing schematic for the voltage adapter system shown in FIG. 1.

FIGS. 1 and 2 show an illustrative embodiment of a voltage adapter system 10 including a voltage modifying device 12 having a first cable assembly 14 for connecting to an AC power supply 16 and a second cable assembly 18 having a first connector 20 for connecting to a DC voltage operable device 22 such as a notebook computer, handheld computing device, or the like.

A key aspect of the illustrative embodiments presented herein is the ability to supply a DC voltage to the DC voltage operable device 22 by converting an AC voltage A supplied from an AC power supply 16 or by enabling a DC voltage to be provided to the DC voltage operable device 22 from a remote DC voltage power supply 24 such as an in-seat power system on an airplane. In many instances, the DC voltage supplied by the remote DC voltage power supply 24 will be within a suitable range with respect to the voltage requirements of the DC voltage operable device 22. In these instances, no additional voltage regulation is required and the DC voltage from the remote DC voltage power supply 24 may be provided directly to the DC voltage operable device 22. For most notebook computers manufactured by DELL Computer Corporation, the output voltage of an in-seat power supply system in an airplane is maintained at a suitable level for direct connection to the computer.

As shown in FIG. 2, the voltage modifying device 12 includes a voltage/converting portion 30 such as an AC-DC voltage converter and a voltage regulating portion 32 such as a DC current voltage regulator. The AC power supply 16 provides an AC voltage A to the voltage converting portion 30. The voltage converting portion 30 converts the AC voltage A to an unregulated DC voltage B. The unregulated DC voltage B is provided to the voltage regulator 32 and a regulated DC voltage C is provided to the DC voltage operable device 22.

Figure 3:
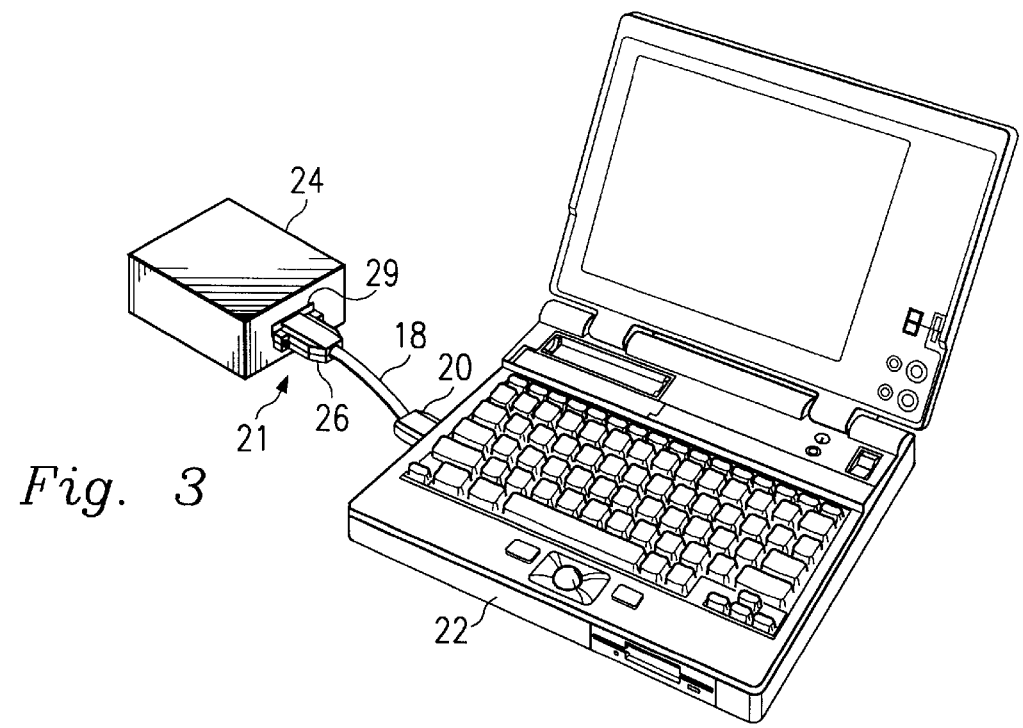
FIG. 3 is a diagrammatic view showing the detachable cable of FIG. 1 connected between a DC voltage power supply and a DC voltage operable device.
Figure 4:
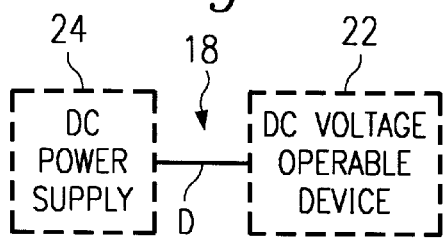
FIG. 4 is a block diagram showing a power routing schematic for the cable attachment configuration shown in FIG. 3.

To facilitate connecting the DC voltage operable device 22 to the remote power supply 24, the second cable assembly 18 is configured to connect to the voltage modifying device 12 at a detachable electrical coupling 21 (shown in FIG. 1). The detachable electrical coupling 21 is comprised of a second connector 26 that is integral with the second cable assembly 18 and a mating socket 28 that is integral with the voltage modifying device 12. As shown in FIGS. 3 and 4, the second cable assembly 18 may be detached from the voltage modifying device 12 and attached to a mating socket 29 that is integral with the remote DC voltage power supply 24 such that a DC voltage D may be provided to the DC voltage operable device 22.

Presently, the EMPOWER in-seat power supply system is the most widely used in-seat power supply system for aircraft. In a preferred embodiment, the second connector 26 of the second cable assembly 18 will be configured to mate with the in-seat seat connector used in the EMPOWER in-seat power supply system. This connector is commonly referred to as an EMPOWER Plug.

For added utility, the voltage adapter system 10 may be used in combination with a commercially available auto socket adapter. Auto sockets are also commonly referred to as cigarette lighter sockets. The second connector 26 of the second cable assembly 18 may be plugged into the auto socket adapter such that power may be supplied from an auto socket.

The regulated voltage C is maintained within a narrow voltage range such as 12 volts with a deviation of no more than 10% whereas the unregulated DC voltage B may be maintained within a much wider range (i.e. 8 to 18 volts). In cases where the DC voltage operable device 22 can operate over a wide range of voltages, the voltage regulator 32 may be omitted providing the voltage converting portion 30 of the voltage modifying device 12 maintains the unregulated DC voltage B within a suitable range.

Figure 5:
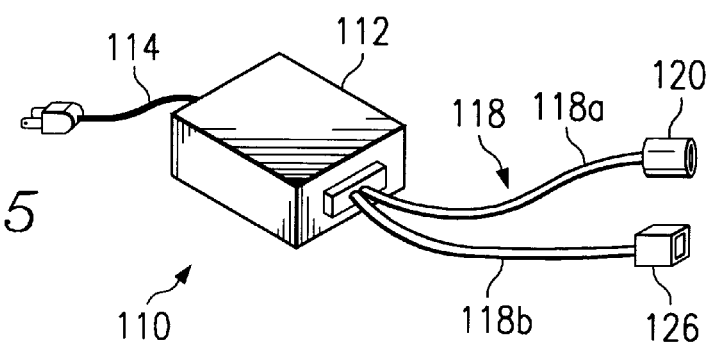
FIG. 5 is a diagrammatic view showing an illustrative embodiment of a voltage adapter system with a non-detachable DC power cable assembly.
Figure 6:
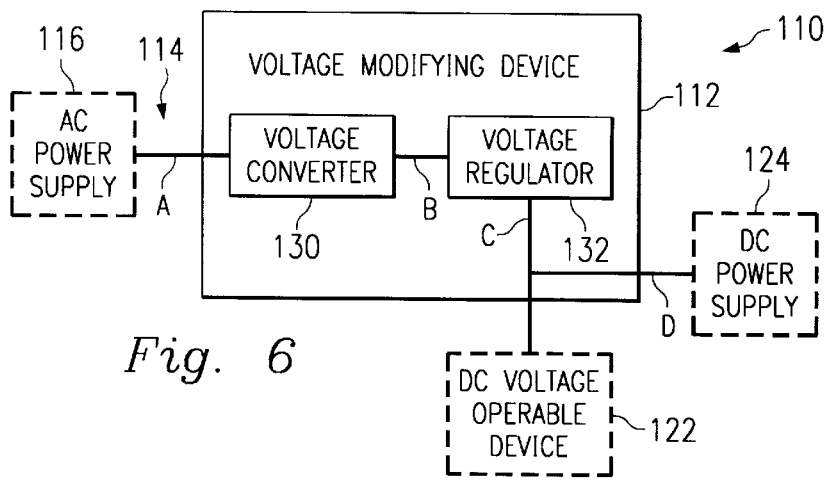
FIG. 6 is a block diagram showing a power routing schematic for the voltage adapter system shown in FIG. 5 wherein the DC voltage provided by the DC voltage power supply by-passes the voltage regulating portion of the voltage modifying device.

FIGS. 5 and 6 show an illustrative embodiment of a voltage adapter system 110 that includes a voltage modifying device 112 having a first cable assembly 114 and a second cable assembly 118. The first cable assembly 114 may be connected to an AC power supply 116. The second cable assembly includes a first cable 118a coupled to a first connector 120 and a second cable 118b coupled to a second connector 126. The first connector 120 provides for connecting to a DC voltage operable device 122 and the second connector 126 provides for connecting to a remote DC voltage power supply 124. The first cable 118a and the second cable 118b are electrically coupled to the voltage modifying device 112.

As shown in FIG. 6, an AC voltage A is provided by the AC power supply 116. The AC voltage A is converted to a regulated DC voltage C via the voltage converting portion 130 and the voltage regulating portion 132 of the voltage modifying device 112. Alternately, a DC voltage D may be provided by the remote DC voltage power supply 124. The DC voltage D is routed through the voltage modifying device 112 such that it by-passes the voltage regulating portion 132. In this configuration, the DC voltage D supplied from the remote DC voltage power supply 124 is provided in an unmodified state to an attached DC voltage operable device 122. In another embodiment (not shown), the DC voltage D is coupled to the voltage regulating portion 132 such that the DC voltage D is regulated with respect to the voltage regulating characteristics of the voltage regulating portion 132. For the embodiments described above, it will be appreciated that the voltage adaptor system should not be connected to an active AC power supply and to an active remote DC voltage power supply at the same time.

Figure 7:
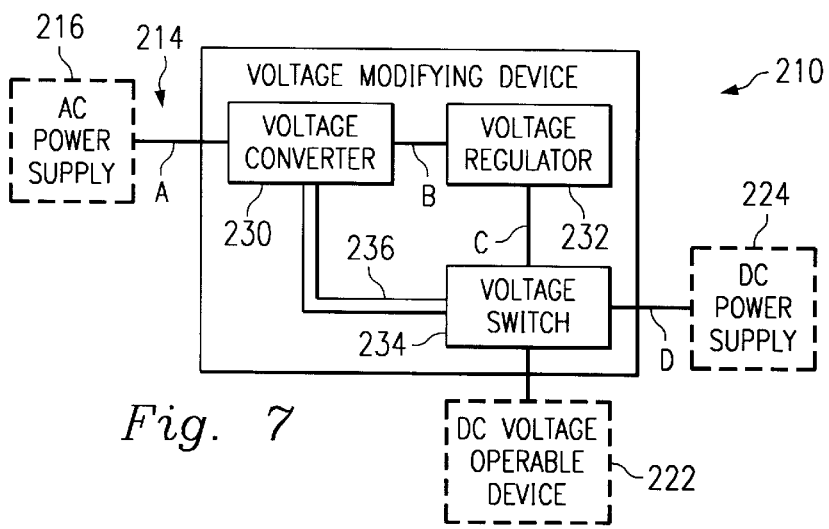
FIG. 7 is a block diagram showing a power routing schematic for the voltage adapter system shown in FIG. 5 wherein the system further includes a voltage switch for controlling the source of the DC voltage and wherein the DC voltage provided by the DC voltage power supply by-passes the voltage regulating portion of the voltage modifying device.

FIG. 7 shows an embodiment of a voltage adapter system 210 in which the DC voltage D from the remote DC voltage power supply 224 and the regulated DC voltage C derived from the AC power supply 216 are routed to a voltage switch 234. A reference signal 236 is provided to the voltage switch 234 for indicating when an active AC power supply 216 is connected to the voltage adapter system 210. When an active AC power supply 216 is detected, the voltage switch 234 routes the unregulated voltage B through the voltage switch 234 and establishes an open circuit between the DC voltage operable device 222 and the remote DC voltage power supply 224.

The open circuit provided by the voltage switch 234 precludes a DC voltage D from the remote DC voltage power supply 224 being supplied to the DC voltage operable device 222 at the same time an active AC power supply is in operation with the voltage adapter system 210. When a reference signal 236 is not detected by the voltage switch 234, the voltage switch 234 routes power from the remote DC voltage power supply 224 through the voltage switch 234 to the DC voltage operable device 222 and establish an open circuit between the AC power supply 216 and the DC voltage operable device 222. As the voltage regulator 232 is positioned ahead of the voltage switch 234, the DC voltage D is provided to the DC voltage operable device 222 without being regulated by the voltage regulating portion 232.

Figure 8:
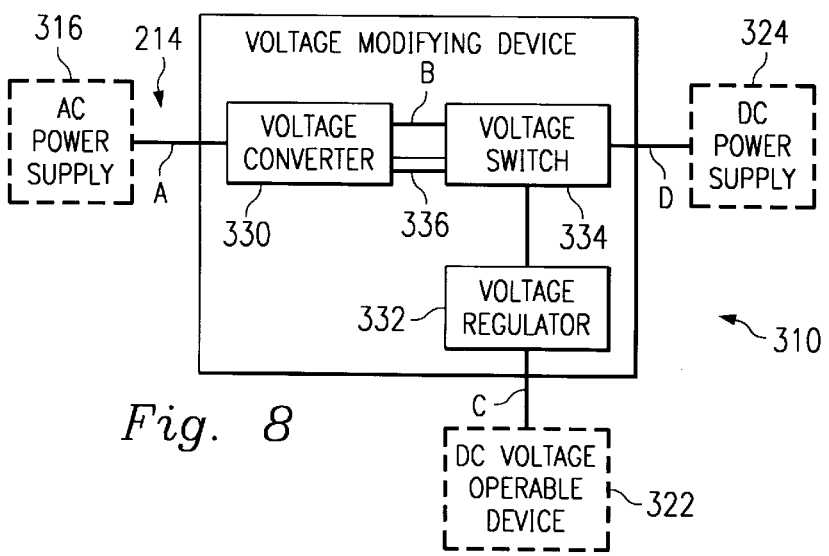
FIG. 8 is a block diagram showing a power routing schematic for the voltage adapter system shown in FIG. 5 wherein the system further includes a voltage switch for controlling the source of the DC voltage and wherein the DC voltage provided by the DC voltage power supply is routed through the voltage regulating portion of the voltage modifying device.

Referring to FIG. 8, an embodiment of a voltage adapter system 310 is shown in which the unregulated DC voltage from the voltage converting portion 330 and the DC voltage D from the remote DC voltage power supply 324 are both routed through the voltage switch 334 prior to being routed through the voltage regulating portion 332. In this configuration, the DC voltage that is provided to the DC voltage operable device 322 is regulated by the voltage regulating portion 332 regardless of whether an AC power supply 316 or a remote DC voltage power supply 324 is the active source of 10 power. The operation of the voltage switch 334 relative to the reference signal 336 is substantially the same as described above in reference to the embodiment of FIG. 7.

The specific mode of operation and structural make-up aspects of the voltage switch, the reference signal, the voltage regulating portion, and the voltage converting portion may vary significantly. For example, the reference signal 336 may be the AC voltage supplied from the AC power supply or it may be the unregulated DC voltage B. With respect to the voltage switch, it may be a solid state device or a mechanical device such as a coil-type relay switch. It should be appreciated that the function of the above-mentioned components is critical to the operation of the applicable embodiments of the present operation rather than the specific mode of operation and structural make-up. It will be apparent to one of ordinary skill in the art that the function of these components may be achieved using a variety of different techniques and components.

In operation, the embodiments disclosed herein provide a voltage adapter system for supplying a DC voltage to a DC voltage operable device. The voltage adapter system may be connected to an AC power supply and the AC voltage subsequently converted to a DC voltage. The same voltage adapter system is also configured to enable a DC voltage from a remote DC voltage power supply to be routed to the DC voltage operable device. A voltage regulating device such as a voltage regulator may be used to maintain the DC voltage supplied to the DC voltage operable device within a narrow range.

As a result, one embodiment provides a voltage adapter system for use with a DC voltage operable device. The voltage adapter system includes a voltage modifying device adapted for converting an AC voltage to a DC voltage and a first cable assembly for being electrically coupled to supply the AC voltage from an AC power supply to the voltage modifying device. The system also includes a second cable assembly having a first portion adapted for being electrically coupled to the device and a second portion adapted for being electrically coupled to selectively supply the DC voltage to the device from the voltage modifying device or from a remote DC voltage power supply.

In another embodiment, a computer system operable on a DC voltage is provided. The computer system includes a microprocessor, a system memory coupled to the microprocessor, a bus coupled to the microprocessor, an input device coupled to the bus, and a voltage adapter system for providing a DC voltage to the computer system. The voltage adapter system includes a voltage modifying device adapted for converting an AC voltage to a DC voltage. A first cable assembly is electrically connected to supply the AC voltage from an AC power supply to the voltage modifying device. A second cable assembly is provided for selectively supplying the DC voltage to the system from the voltage modifying device or from a remote DC voltage power supply. The second cable assembly is connectable at a first end to system and connectable at a second end to the voltage modifying device and to the remote DC voltage power supply.

In yet another embodiment, a voltage adapter system for use with a DC voltage operable device is provided. The voltage adapter system includes a voltage modifying device capable of converting an AC voltage to a DC voltage and a first cable assembly electrically coupled to supply the AC voltage from an AC power supply to the voltage modifying device. An electrical connecting assembly for selectively supplying the DC voltage to the operable device from the voltage modifying device or from a remote DC voltage power supply is also provided. The electrical connecting assembly is connectable at a first end to operable device and connectable at a second end to the voltage modifying device and to the remote DC voltage power supply.

As it can be seen, a voltage adapter system according to the illustrative embodiments presented herein provides many advantages relative to conventional voltage adapter systems. Systems according to the illustrative embodiments presented herein can be used to provide AC to DC converting and to provide connection with DC power sources, the space and weight of the apparatus to be reduced relative to conventional systems. One cable can be used for the AC to DC and DC to DC operation. The use of one DC power delivery cable further reduces the weight and space requirements. Systems according to the illustrative embodiments presented herein can be designed to be compatible with existing electronic devices whereby no modification to the electronic devices is required.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A voltage adapter system for use with a DC voltage operable device and a remote DC voltage power supply, comprising:

a voltage modifying device for converting an AC voltage to a DC voltage;

a first cable assembly for electrically coupling an AC power supply to the voltage modifying device;

a second cable assembly having a first connector for being electrically coupled to the DC voltage operable device and a second connector for being electrically coupled to the remote DC voltage power supply, the first connector being electrically coupled to the second connector and to the voltage modifying device; and a voltage switch electrically coupled between the first and second connectors and being responsive to the AC voltage to electrically decouple the first connector from the second connector.

2. A voltage adapter system for use with a DC voltage operable device and a remote DC voltage power supply, comprising:

a voltage modifying device for converting an AC voltage to a DC voltage;

a first cable assembly for electrically coupling an AC power supply to the voltage modifying device;

a second cable assembly having a first connector for being electrically coupled to the DC voltage operable device and a second connector for being electrically coupled to the remote DC voltage power supply, the first connector being electrically coupled to the second connector and to the voltage modifying device; and the voltage modifying device including a voltage regulating portion for maintaining the DC voltage supplied to the DC voltage operable device at a prescribed voltage level and wherein the first connector is electrically coupled to the second connector through the voltage regulating portion.

3. A voltage adapter system for use with a DC voltage operable device and a remote DC voltage power supply, comprising:

a voltage modifying device for converting an AC voltage to a DC voltage;

a first cable assembly for electrically coupling an AC power supply to the voltage modifying device;

second cable assembly having a first connector for being electrically coupled to the DC voltage operable device and a second connector for being electrically coupled to the remote DC voltage power supply, the first connector being electrically coupled to the second connector and to the voltage modifying device; and the voltage modifying device including a voltage switch, the voltage switch being electrically coupled between the first and second connectors and being responsive to the AC voltage to electrically decouple the first connector from the second connector.

4. A voltage adapter system for use with a DC voltage operable device and a remote DC voltage power supply, comprising:

a voltage modifying device for converting an AC voltage to a DC voltage;

a first cable assembly for electrically coupling an AC power supply to the voltage modifying device;

a second cable assembly having a first connector for being electrically coupled to the DC voltage operable device and a second connector for being electrically coupled to the remote DC voltage power supply, the first connector being electrically coupled to the second connector and to the voltage modifying device; and the voltage modifying device including a voltage converting portion and a voltage regulating portion, the voltage regulating portion being electrically coupled between the voltage switch and the second connector and being adapted to maintain the DC voltage supplied to the DC voltage operable device at a prescribed voltage level.

5. The voltage adapter system of claim 1 wherein the second cable assembly includes a first cable and a second cable.

6. The voltage adapter system of claim 5 wherein the first connector is electrically coupled to the first cable and the second connector is electrically coupled to the second cable.

7. The voltage adapter system of claim 5 wherein the first and second cables are electrically coupled to the voltage modifying device.

8. A computer system operable on a DC voltage, said computer system comprising:

a microprocessor;

a system memory coupled to the microprocessor;

a bus coupled to the microprocessor;

an input device coupled to the bus; and a voltage adapter system for providing a DC voltage to the computer system, the voltage adapter system, comprising:

a voltage modifying device for converting an AC voltage to a DC voltage;

a first cable assembly for electrically coupling an AC power supply to the voltage modifying device;

a second cable assembly having a first connector for being electrically coupled to the DC voltage operable device and a second connector for being electrically coupled to the remote DC voltage power supply, the first connector being electrically coupled to the second connector and to the voltage modifying device; and a voltage switch electrically coupled between the first and second connectors and being responsive to the AC voltage to electrically decouple the first connector from the second connector.

9. A computer system operable on a DC voltage, said computer system comprising:

a microprocessor;

a system memory coupled to the microprocessor;

a bus coupled to the microprocessor;

an input device coupled to the bus; and a voltage adapter system for providing a DC voltage to the computer system, the voltage adapter system, comprising:

a voltage modifying device for converting an AC voltage to a DC voltage;

a first cable assembly for electrically coupling an AC power supply to the voltage modifying device;

a second cable assembly having a first connector for being electrically coupled to the DC voltage operable device and a second connector for being electrically coupled to the remote DC voltage power supply, the first connector being electrically coupled to the second connector and to the voltage modifying device; and the voltage modifying device including a voltage regulating portion for maintaining the DC voltage supplied to the DC voltage operable device at a prescribed voltage level and wherein the first connector is electrically coupled to the second connector through the voltage regulating portion.

10. A computer system operable on a DC voltage, said computer system comprising:

a microprocessor;

a system memory coupled to the microprocessor;

a bus coupled to the microprocessor;

an input coupled to the bus; and a voltage adapter system for providing a DC voltage to the computer system, the voltage adapter system, comprising:
  a voltage modifying device for converting an AC voltage to a DC voltage;
  a first cable assembly for electrically coupling an AC power supply to the voltage modifying device;
  second cable assembly having a first connector for being electrically coupled to the remote DC voltage power supply, the first connector being electrically coupled to the second connector and to the voltage modifying device; and
  the voltage modifying device further including a voltage switch, the voltage switch being electrically coupled between the first and second connectors and being responsive to the AC voltage to electrically decouple the first connector from the second connector.

11. A computer system operable on a DC voltage, said computer system comprising:

a microprocessor;

a system memory coupled to the microprocessor;

a bus coupled to the microprocessor;

an input coupled to the bus; and a voltage adapter system for providing a DC voltage to the computer system, the voltage adapter system, comprising:
  a voltage modifying device for converting an AC voltage to a DC voltage;
  a first cable assembly for electrically coupling an AC power supply to the voltage modifying device;
  a second cable assembly having a first connector for being electrically coupled to the DC voltage operable device and a second connector for being electrically coupled to the second connector and to the voltage modifying device; and
  the voltage modifying device further including a voltage converting portion and a voltage regulating portion, the voltage regulating portion being electrically coupled between the voltage switch and the second connector and being adapted to maintain the DC voltage supplied to the DC voltage operable device at a prescribed voltage level.

12. The voltage adapter system of claim 8 wherein the second cable assembly includes a first cable and a second cable.

13. The voltage adapter system of claim 12 wherein the first connector is electrically coupled to the first cable and the second connector is electrically coupled to the second cable.

14. The voltage adapter system of claim 2 wherein the first and second cables are electrically coupled to the voltage modifying device.

15. A voltage adapter system for use with a DC voltage operable device and a remote DC voltage power supply, comprising:

a voltage modifying device for converting an AC voltage to a DC voltage, the voltage modifying device having a mating socket electrically coupled thereto;

a first cable assembly for coupling an AC voltage power supply to the voltage modifying device;

a second cable assembly having a first connector for being electrically coupled to the DC voltage operable device and having a second connector removably coupled to the mating socket of the voltage modifying device, the second connector being connectable to a respective mating socket of the remote DC voltage power supply; and a voltage switch electrically coupled between the first and second connectors and being responsive to the AC voltage to electrically decouple the first connector from the second connector.

16. A computer system operable on a DC voltage, said computer system comprising:

a microprocessor;

a system memory coupled to the microprocessor;

a bus coupled to the microprocessor;

an input coupled to the bus; and voltage adapter system for providing a DC voltage to the computer system, the voltage adapter system, comprising:
  a voltage modifying device for converting an AC voltage to a DC voltage, the voltage modifying device having a mating socket electrically coupled thereto;
  a first cable assembly for coupling an AC voltage power supply to the voltage modifying device;
  a second cable assembly having a first connector for being electrically coupled to the DC voltage operable device and having a second connector removably coupled to the mating socket of the voltage modifying device, the second connector being connectable to the respective mating socket of the remote DC voltage power supply; and
  a voltage switch electrically coupled between the first and second connectors and being responsive to the AC voltage to electrically decouple the first connector from the second connector.

17. A voltage adapter system for use with a DC voltage operable device and an in seat power supply in an aircraft, comprising:

a voltage modifying device for converting an AC voltage to a DC voltage, the voltage modifying device including a voltage regulating portion maintaining the DC voltage supplied to the DC voltage operable computing device at a prescribed voltage level;

a first cable assembly for electrically coupling an AC power supply to the voltage modifying device;

a second cable assembly having a first connector for being electrically coupled to the DC voltage operable device and a second connector for being electrically coupled to the in-seat power supply, the first connector being electrically coupled to the second connector and to the voltage modifying device, the first connector being electrically coupled to the second connector through the voltage regulating portion; and a voltage switch electrically coupled between the first and second connectors and being responsive to the AC voltage to electrically decouple the first connector from the second connector.

18. The voltage adapter system of claim 17 wherein the second cable assembly includes a first cable and a second cable.

19. The voltage adapter system of claim 18 wherein the first connector is electrically coupled to the first cable and the second connector is electrically coupled to the second cable.

20. The voltage adapter system of claim 18 wherein the first and second cables are electrically coupled to the voltage modifying device.

* * * * *

UNITED STATES PATENT AND TRADEMARK OFFICE
CERTIFICATE OF CORRECTION

PATENT NO. : 6,172,891 B1
DATED : January 9, 2001
INVENTOR(S) : Sean O'Neal et al.

It is certified that error appears in the above-identified patent and that said Letters Patent is hereby corrected as shown below:

Column 4,
Line 37, after "assembly", insert -- 118 --.

Column 6,
Line 14, after "input", delete -- device --.
Line 24, after "to", insert -- the --.

Column 10,
Line 14, before "voltage adapter system", insert -- a --.

Signed and Sealed this

Ninth Day of April, 2002

Attest:

Attesting Officer

JAMES E. ROGAN
Director of the United States Patent and Trademark Office